United States Patent
Anderson et al.

(10) Patent No.: US 7,835,103 B2
(45) Date of Patent: Nov. 16, 2010

(54) TAPE DRIVE WITH VARIABLE WRAP REVERSAL LOCATION

(75) Inventors: James C. Anderson, Eagle, ID (US); Vernon L. Knowles, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 162 days.

(21) Appl. No.: 12/242,180

(22) Filed: Sep. 30, 2008

(65) Prior Publication Data
US 2010/0079907 A1    Apr. 1, 2010

Related U.S. Application Data

(60) Provisional application No. 61/029,061, filed on Feb. 15, 2008.

(51) Int. Cl.
*G11B 15/087* (2006.01)
*G11B 15/22* (2006.01)
*G11B 15/43* (2006.01)
*G11B 15/44* (2006.01)

(52) U.S. Cl. ..................... 360/74.4; 360/72.2
(58) Field of Classification Search ............ None
See application file for complete search history.

(56) References Cited

U.S. PATENT DOCUMENTS

| 5,264,972 | A | * | 11/1993 | Solhjell | 360/72.3 |
| 5,287,229 | A | * | 2/1994 | Saito et al. | 360/74.4 |
| 5,367,471 | A | | 11/1994 | Nguyen et al. | |
| 5,446,605 | A | * | 8/1995 | Umehara et al. | 360/74.6 |
| 5,448,427 | A | * | 9/1995 | Masuda et al. | 360/74.1 |
| 5,572,378 | A | * | 11/1996 | Schwarz et al. | 360/74.4 |
| 5,608,585 | A | * | 3/1997 | Masuda et al. | 360/74.1 |
| 5,847,893 | A | * | 12/1998 | Ishihara et al. | 360/74.4 |
| 6,775,086 | B1 | * | 8/2004 | Kobayashi et al. | 360/74.1 |
| 6,937,411 | B2 | * | 8/2005 | Goodman et al. | 360/72.1 |
| 7,064,916 | B2 | * | 6/2006 | Kobayashi et al. | 360/74.1 |
| 7,085,091 | B1 | * | 8/2006 | Kientz | 360/74.1 |
| 7,372,657 | B2 | * | 5/2008 | Gill et al. | 360/74.1 |

\* cited by examiner

*Primary Examiner*—Hoa T Nguyen
*Assistant Examiner*—James L Habermehl

(57) ABSTRACT

A system and method for reducing tape wear in a magnetic tape system. A tape drive comprises a wrap reverse location controller. The wrap reverse location controller determines a magnetic tape reversal location. The tape drive reverses the direction of the magnetic tape at the reversal location. The wrap reverse location controller determines the tape reversal location by varying, relative to the tape heads, the longitudinal tape location at which tape direction reversals are performed at each end of the tape.

22 Claims, 2 Drawing Sheets

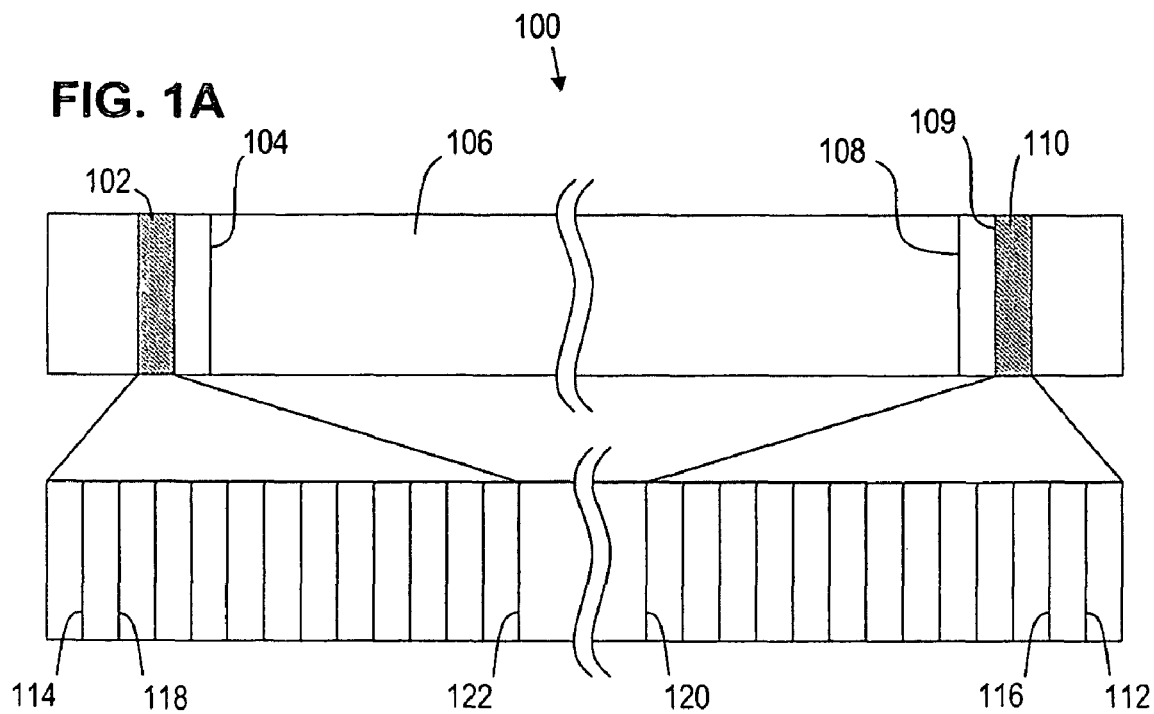
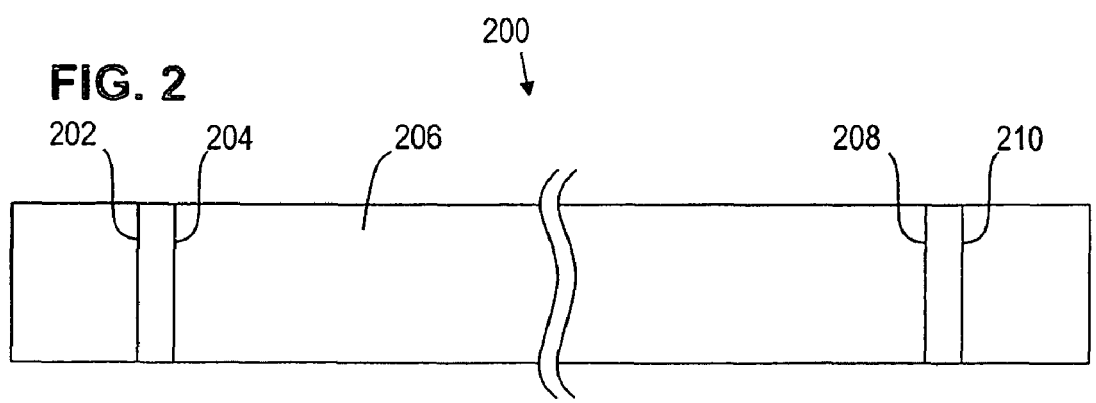

TAPE DRIVE WITH VARIABLE WRAP REVERSAL LOCATION

CROSS REFERENCE TO RELATED APPLICATIONS

This Application claims the benefit of U.S. Provisional Application Ser. No. 61/029,061 filed Feb. 15, 2008, titled "Tape Drive With Variable Wrap Reversal Location" which is hereby incorporated by reference herein as if reproduced in full below.

BACKGROUND

Magnetic storage devices are often included in computer systems to provide high capacity secondary storage or data archival. Magnetic tape systems are a type of magnetic storage. Magnetic tape systems are widely used because they provide high storage densities while employing low cost media.

A magnetic tape system generally comprises a recording media, magnetic tape, and a media access device known as a tape drive or tape transport that reads data from and writes data to the magnetic tape. A magnetic tape typically comprises a flexible narrow ribbon of a base material (e.g., polyester films such as polyethylene naphthalate or polyethylene terephthalate), and a magnetic material, such as a metal particulate, affixed to the base material by a binding agent (e.g:, vinyl chloride polymer). The tape drive accesses the magnetic tape as the tape passes over a set of transducers called "heads." "Write heads" generate magnetic fields which encode data onto the tape as the tape passes over the heads. "Read heads" sense the magnetic fields of the tape's magnetic material to read data from the tape.

Magnetic tape systems are subject to a phenomenon whereby the surface of the magnetic tape adheres to a component of the tape drive, for example the tape head assembly. This phenomenon is sometimes referred to as "stiction." A variety of conditions, including binder formulations and environmental factors, operate to promote stiction. After adhesion occurs, breaking the tape free from the heads may cause damage to the tape surface, or other severe failures including deformation or breaking of the tape media.

Linear tape systems employ multiple data tracks that run parallel to one another over the length of the tape. Such tapes often include more data tracks than the tape drive has heads. These systems use a serpentine recording method wherein a first set of data tracks is written as the tape moves across the heads in a forward direction, and a second set of data tracks is written as the tape moves across the heads in the reverse direction. Many direction reversals may be required to write a tape with hundreds or thousands of tracks, with each direction reversal necessitating a momentary halt of tape motion. Serpentine recording systems typically stop the tape at the same location at the beginning and end of tape when changing directions. Repetitively stopping the tape at the same location can cause excessive wear oh the tape at the locations where the heads contact the tape near zero velocity, and possibly result in the tape sticking to the heads.

BRIEF DESCRIPTION OF THE DRAWINGS

For a detailed description of exemplary embodiments of the invention, reference will now be made to the accompanying drawings in which:

FIG. 1A shows a magnetic tape wherein a tape drive varies the location at which tape direction is reversed in accordance with various embodiments;

FIG. 1B shows regions of a magnetic tape comprising a plurality of locations for stopping and reversing the direction of the tape in accordance with various embodiments;

FIG. 2 shows a magnetic tape wherein a tape drive reduces tape tension while reversing tape direction in accordance with various embodiments;

NOTATION AND NOMENCLATURE

Figure 3:
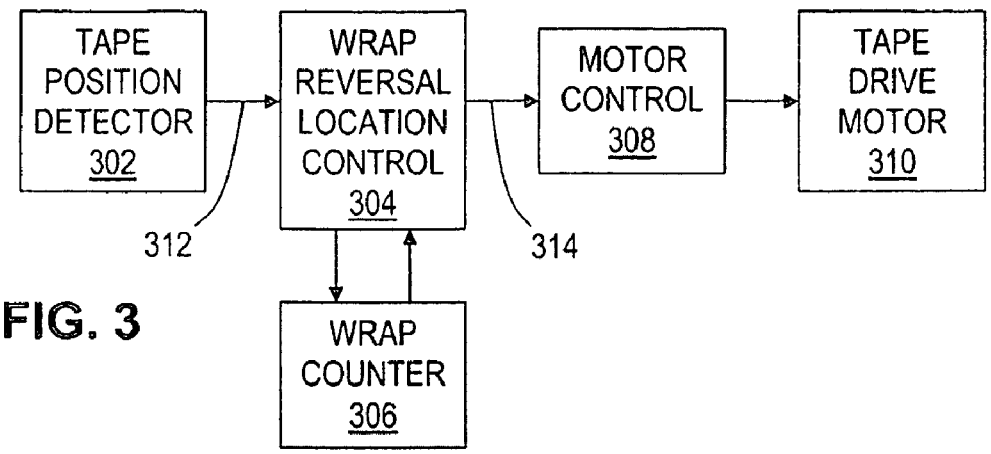
FIG. 3 shows a block diagram of a tape drive that varies the reversal location of a magnetic tape in accordance with various embodiments.

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection. The term "system" refers to a collection of two or more hardware and/or software components, and may be used to refer to an electronic device or devices, or a sub-system thereof. Further, the term "software" includes any executable code capable of running on a processor, regardless of the media used to store the software. Thus, code stored in non-volatile memory, and sometimes referred to as "embedded firmware," is included within the definition of software.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Linear tape drives write data to tape in parallel tracks that longitudinally span at least a data region of the tape. Generally, multiple tape heads simultaneously write a number of parallel tracks onto the tape. Linear tape drives that employ serpentine recording use tapes that have more tracks than the tape drive has heads, for example, hundreds or thousands of tracks versus tens of heads. The tape drive positions its heads on the tape and writes a set of tracks as the tape moves across the heads from one end of the data region to the other. On reaching the end of the data region, the heads are repositioned to write another set of tracks, the tape direction is reversed and writing resumes until the end of data region is reached in the reverse direction. Head repositioning and tape direction reversal continues until the tape is full or all the data to be written is on tape. Each pass down the length of the tape is called a "wrap."

The tape's tendency to adhere to the heads of a linear serpentine tape drive is influenced by a variety of factors. While changing directions at the end of a wrap, tape drives generally maintain the same tension as is applied while writing, pulling the tape into contact with the heads when stopped. The point of reversal is also very precise causing the tape to stop at the same location against the heads at the end of each wrap. These factors lead to a wear spot at the turn-around point which is smoother than the rest of the tape, and can cause the tape to adhere to the heads at the point of zero velocity. Additionally, contaminants, such as lubricants from the base film, build up at the stop point making the tape more likely to stick to the heads when stopped. Further, as tape technology advances, storage density, in terms of the number of bits per inch recorded on tape, increases. To enable reading and writing to tape at increasing bit densities, the distance between the tape and the read and write heads must be reduced. Reducing the distance between the heads and the tape requires that the tape be made smoother, further increasing the likelihood of the tape sticking to the heads with increasing bit densities.

Embodiments of the present disclosure stagger, randomize, or otherwise select variant turn-around points on tape to spread the wear over a larger area of the tape, thus not creating a sticky spot on the tape, and reducing the likelihood that the tape will adhere to the heads when stopped. Embodiments also reduce the tape wear spot by lowering the tape tension during a direction reversal.

FIG. 1A shows a magnetic tape 100 wherein a tape drive varies the location at which tape direction is reversed in accordance with various embodiments. The exemplary tape 100 includes a beginning of tape ("BOT") reversal region 102, a data region 106 starting at point 104 and ending at point 108, and an end of tape ("EOT") reversal region 110. Rather than reversing tape direction within regions 102, 110 at the same point on each wrap, embodiments reverse the direction of tape motion at a plurality of points within reversal regions 102, 110. Thus, embodiments spread the wear associated with the direction reversals over a relatively broad area rather than concentrating the wear at a single point. By not concentrating wear at a single point, embodiments avoid creation of a smooth sticky spot on tape and reduce the likelihood that the tape will adhere to the heads.

Initial access to tape data, for reading or writing, begins at point 104, the start of the tape's data region 106, after the tape drive's heads traverse reversal region 102. For example, if writing, the tape drive's write heads are positioned to write a first set of tracks prior to the arrival of point 104 at the tape heads. As the tape heads pass over point 104, and throughout data region 106 up to point 108, magnetic fields generated in the write heads encode data on selected tracks of the tape 100. The tape drive ceases writing user data as the point 108 passes over the heads. A point within region 110 is selected for tape direction reversal. Tape motion is stopped at the selected point and resumed in the reverse direction with the tape heads repositioned to write a second set of tracks with point 108 moving towards the heads. The tracks are written as data region 106 passes over the write heads in the direction of point 104. As the reverse wrap completes, a point within reversal region 102 is selected as the point at which the tape will again change direction. The tape is stopped at the selected point and its direction is reversed. The write heads are repositioned to write a third set of tracks and the tracks are written within data region 106 as the tape advances in the direction of point 108. As the second forward wrap completes, a second reversal point within region 110 is selected for tape direction reversal. The second reversal point preferably differs from the point selected within region 110 for the first forward wrap reversal, thus reducing the wear and debris accumulated at each reversal point. Writing of the tape continues in the fashion described above, preferably with a different reversal point selected for each direction reversal within the reversal regions 102, 110, until the entirety of the user data is written to tape or the tape is full.

As explained above, on each successive wrap the tape drive selects a different reversal point within the reversal region 102, 110. Some embodiments select a reversal point within the reversal region 102, 110 at random. For example, an embodiment may select a random distance from point 109, the start of reversal region 110, as a reversal point. "Random" as used herein refers to the use of random or pseudo-random reversal point generation methods to spread reversal points across the reversal region 102, 110. Random selection of reversal points advantageously spreads the wear associated with direction reversal across the reversal region 102, 110. Such randomization does not, however, avoid having the heads pass over previously selected reversal points with the region 102, 110, or guarantee that all reversal points are different.

While some embodiments employ random selection of reversal points as described above, other embodiments apply more deterministic selection methods. FIG. 1B shows reversal regions 102, 110 of a magnetic tape 100 comprising a plurality of locations for stopping and reversing the direction of the tape in accordance with various embodiments. An embodiment that spreads wear across the reversal region 102, 110, and avoids having the heads pass over previously used reversal points, selects point 112, the reversal point farthest from the end of user data 108 as the turn-around point for the first forward wrap. Similarly, point 114, the reversal point farthest from the end of user data 104 written on the first reverse wrap is selected as the first reverse wrap reversal point. Each subsequent direction reversal is performed at a slightly shorter distance from the end of the user data (e.g., 15 mm closer to the end of user data than the last reversal point). Thus, the direction reversal following the second forward wrap is performed at point 116, and the direction reversal following the second reverse wrap is performed at point 118. Reversals performed at each end of the tape continue in the fashion described with each successive reversal point being closer to the data region 106 than the last until the final reversals are performed at points 120, 122 as the tape nears capacity.

Other embodiments distribute reversal points across a reversal region 102, 110 in a variety of other ways. For example, an embodiment may perform the first forward wrap reversal at point 120 with succeeding reversal occurring successively farther from data region 106. While embodiments perform direction reversals at a plurality of reversal points within each reversal region 102, 110, embodiments need not select different points for each and every reversal performed within a reversal region 102, 110. Accordingly, the present disclosure encompasses all embodiments performing wrap direction reversals at multiple points within a reversal region 102, 110 at each end of the tape 100.

FIG. 2 shows a magnetic tape 200 wherein a tape drive reduces tape tension while reversing tape direction in accordance with various embodiments. The exemplary magnetic tape 200 comprises a data region 206 from which the tape drive reads and/or writes user data. The data region 206 is bounded by points 204 and 208. The tape 200 further comprises a forward wrap direction reversal point 210 near EOT, and a reverse wrap direction reversal point 202 near BOT. Tape drives generally maintain the same tape tension while reversing tape direction at reversal points 202, 210 as is applied when moving tape for read or write access. When the tape is at zero velocity, however, this level of tension brings the tape into contact with the tape heads, thus concentrating wear at reversal points 202, 210 and increasing the likelihood that the tape will adhere to the heads at reversal points 202, 210. Accordingly, some embodiments reduce the tape tension when performing a direction reversal at points 202, 210. Reducing the tape tension during direction reversals, diminishes tape wear at direction reversal points 202, 210, and thus reduces the probability of stiction at the wear point. Embodiments apply reduced tape tension at a direction reversal point using either a single reversal point 202, 210 at each end of the tape, or in conjunction with methods for using multiple reversal points 102, 110 at each end of the tape as described herein.

FIG. 3 shows a block diagram of a tape drive that varies the reversal location of a magnetic tape in accordance with various embodiments. An embodiment comprises a tape position detector 302, a wrap reversal location controller 304, a wrap counter 306, a motor controller 308, and a tape drive motor 310. In practice, a tape drive comprises other components that are omitted from FIG. 3 to facilitate explanation of the embodiments. The tape position detector 302 determines the longitudinal position of the tape. In relevant part, the tape position detector 302 determines that the tape heads have exited the tape's data region 106 when executing a forward or reverse wrap indicating that a direction reversal is imminent, and that a selected direction reversal position has been reached. Tape position may be determined by a variety of means, for example, by monitoring information included in servo tracks written onto the tape at manufacture.

Tape position information 312 is provided to the wrap reversal location controller 304. The wrap reversal location controller 304 selects a tape position where a tape direction reversal will occur at the end of a wrap. The wrap location controller 304 varies the tape locations selected for direction reversal in order to reduce the wear and debris accumulating at each reversal point. In some embodiments, the wrap reversal location controller 304 selects a tape reversal location at random from a plurality of possible tape reversal locations within a reversal region 102, 110. Such embodiments distribute the wear associated with tape reversal to reduce stiction at the reversal point, but fail to avoid having the heads pass over previously used reversal locations. Embodiments generate "random" reversal points using hardware random number generators or any of a variety of hardware or software based pseudo-random number generators that produce output values suitable for spreading reversal points across the reversal region 102, 110. For example, an embodiment may produce a reversal point within region 102, 110 as a value produced by a pseudo-random number generator modulo the number of desired reversal points at an end of the tape.

In other embodiments, the wrap reversal location controller 304 selects the next reversal location to be a minimum reversal distance increment (e.g., 10, 15 millimeters) closer to the user data region 106 than the last used reversal location. For example, reversal location 116 is selected for the second forward wrap reversal if location 112 was selected for the first forward wrap reversal. Such embodiments select the reversal location most distant from the user data as the first used reversal location. Thus, wear associated with tape reversal is distributed over a reversal region 102, 110 of the tape rather than concentrated at a single point of the tape, and the tape heads need not cross previously used reversal points to reach the currently selected reversal point. Embodiments select the next reversal location, for example, by multiplying the number of wraps executed (as maintained by wrap counter 306) by a minimum inter-reversal point distance or by adding the minimum inter-reversal point distance to the last used reversal location.

The wrap reversal location controller 304 provides instructions 314 to the motor controller 308 regarding the tape direction reversal, and the motor controller 308 in turn causes the tape drive motor 310 to decelerate and stop at the selected reversal point and subsequently to reverse the tape direction and accelerate the tape to an operational velocity. Additionally, by controlling tape drive motor 310 current, motor controller 308 controls the tension applied to the tape during direction reversal to reduce tape wear at the reversal point.

Embodiments of the motor controller 308 control the tape drive motor 310 so as to cause the tape to accelerate from stop at a rate allowing the drive to confirm proper transfer of tape from the supply reel to the take-up reel before accelerating the drive motor 310 to operational velocity at a faster rate. Thus, embodiments allow the drive to detect tape stiction and to avoid excessive slack in the tape caused by accelerating the supply reel at too fast a rate when the tape is stuck to the heads.

Embodiments of the wrap reversal location controller 304 may be implemented as software programming running on a Digital Signal Processor, micro-controller, microprocessor, or other hardware capable of executing instructions. Some embodiments may be implemented as programmable hardware, such as field programmable gate arrays, or as fixed logic blocks.

Figure 4:
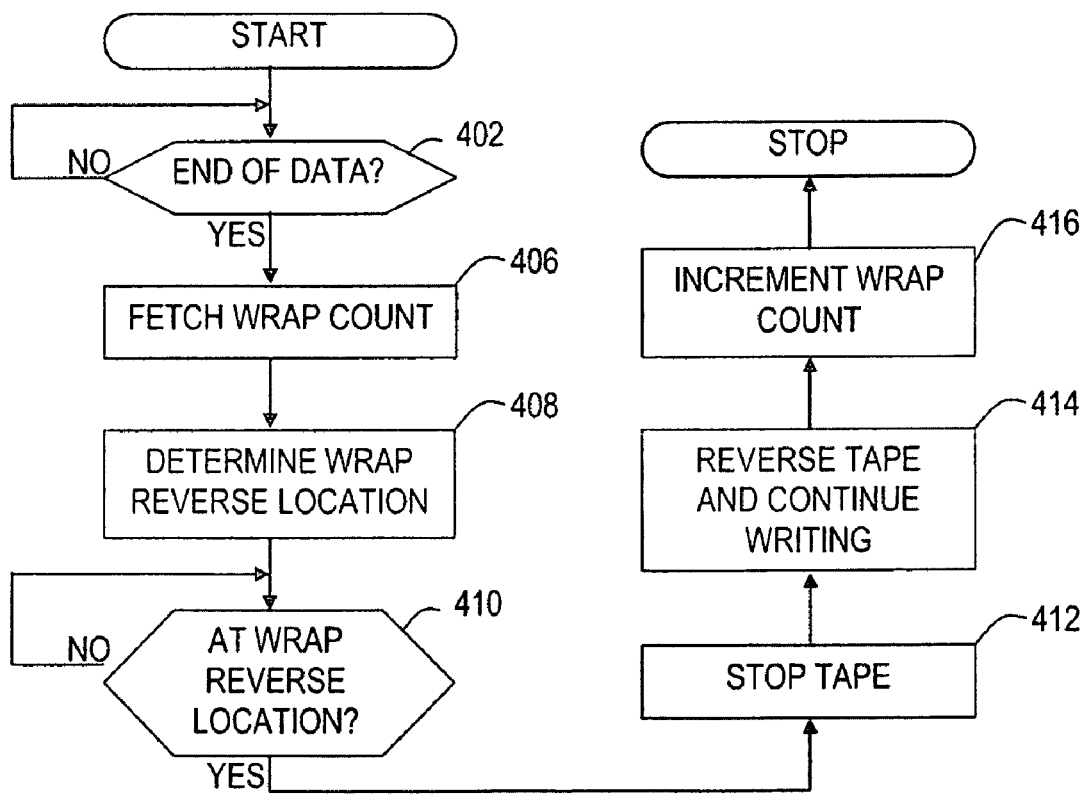
FIG. 4 shows a flow diagram for a method for reducing adhesion between a tape head and a magnetic tape by varying the location at which the tape direction is reversed in accordance with various embodiments.

FIG. 4 shows a flow diagram for a method for reducing adhesion between a tape head and a magnetic tape by varying the location at which the tape direction is reversed in accordance with various embodiments. Though depicted sequentially as a matter of convenience, at least some of the actions shown can be performed in a different order and/or performed in parallel. In block 402, the tape drive is moving the tape, for example, writing user data to the tape, and tape position detector 302 is monitoring the tape to determine whether the end of the tape region assigned to user data 106 has been encountered. The tape position detector 302 may determine the tape's position in a variety of ways, for example, by reading position information encoded in a servo track, or detecting other markings on the tape, or by accessing internally maintained tape position data.

On reaching the end of data region 106 the tape drive prepares for direction reversal. Direction reversals are necessary because the magnetic tape accommodates more tracks than the tape drive has heads. The tape drive, therefore, performs multiple passes (wraps) along the tape, positioning its heads to write or read a different set of tracks on each pass. Performing the direction reversal at the same point on each wrap concentrates wear at the reversal point and thus increases the probability that the tape will stick to the heads when the tape is halted at the smooth wear point. Rather than concentrating tape wear at a single point, embodiments distribute wear created by tape direction reversals over a broad area of the tape to reduce the probability of the tape adhering to the heads.

In block 406, a wrap count indicating the number of passes performed along the tape is retrieved from memory (i.e., wrap counter 306). The tape location of the imminent wrap reversal is determined by the wrap reversal location controller 304 in block 408. The tape locations selected for direction reversals differ over direction reversals occurring at the same end of the tape. Some embodiments use the wrap count to compute the tape location at which the direction reversal is to be performed. Various embodiments compute the next reversal location as an offset from the last reversal point at the relevant end of tape, or select a reversal point at random within a defined reversal region 102, 110 of the tape. Some embodiments select the reversal point farthest from the user data 112 as the reversal point for the first wrap then select the next unused reversal point closer to the user data on each succeeding wrap; thus tape wear is distributed and the heads need not traverse previously used reversal points.

In block 410, the tape position detector 302 monitors the tape to determine whether the selected reversal location has been reached. As the tape approaches the reversal point, the motor controller 308 decelerates the tape and tape motion stops, in block 412, at the selected reversal point. The tape direction is reversed and the heads are repositioned to access a different set of tracks in block 414. The motor controller 208 thereafter accelerates the tape to operational velocity, and writing and/or reading of user data continues in the data region 106 of the tape. Some embodiments relax tape tension during reversal to help prevent the tape from adhering to the heads. Embodiments may apply tension relaxation during direction reversal alone or in concert with use of multiple reversal points. Some embodiments accelerate them tape at a rate allowing confirmation of tape motion on the tape supply reel before accelerating the tape to operational velocity.

In block 416, the wrap count is incremented for use in selecting the next tape reversal location.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A tape drive, comprising:
   a wrap reverse location controller that determines a magnetic tape reversal location at which the tape drive will reverse the direction of a magnetic tape; and
   wherein the wrap reverse location controller determines the tape reversal location by varying, relative to the tape heads and a previous tape stop location, a longitudinal tape location at which tape direction reversal is performed at a first end of the tape.

2. The tape drive of claim 1, wherein the wrap location controller defines a reversal region at each end of the magnetic tape, each reversal region comprising a plurality of tape reversal locations.

3. The tape drive of claim 2, wherein the wrap location controller variably selects a tape reversal location from the plurality of tape reversal locations within the reversal region at each end of the magnetic tape.

4. The tape drive of claim 1, wherein the wrap location controller selects a location for tape motion reversal at an end of the magnetic tape that is a pre-determined distance closer to a data region of the tape than a previously selected tape motion reversal location at the same end of the magnetic tape.

5. The tape drive of claim 1, wherein the wrap location controller selects the tape reversal location at random from a plurality of possible tape reversal locations.

6. The tape drive of claim 1, wherein the wrap location controller selects the tape reversal location such that the tape heads do not pass over a previously selected tape reversal location.

7. The tape drive of claim 1, wherein the tape drive is a linear tape-open ("LTO") tape drive.

8. The tape drive of claim 1, further comprising a motor controller that reduces the tension applied to the tape during a tape direction reversal.

9. The tape drive of claim 1, wherein the wrap location controller defines the number of reversal locations on the magnetic tape to be at least as great as one less than the number of wraps required to fill the tape.

10. The tape drive of claim 1, wherein the tape drive accelerates tape at a first rate until tape motion is confirmed and accelerates the tape at a second rate after tape motion is confirmed, the second acceleration rate is higher than the first acceleration rate.

11. A method, comprising:
    determining, based on a previous tape stop location, a tape reversal location at which the tape should be stopped and the tape direction reversed, the determined tape location differing over tape direction reversals occurring at the same end of the tape;
    reversing the direction of tape motion at the determined tape location.

12. The method of claim 11, further comprising selecting each successive reversal location at an end of a tape to be a pre-determined distance closer to the tape data region than the last selected tape reversal location at the end of the tape.

13. The method of claim 11, further comprising selecting at random a tape reversal location within a tape reversal region of the tape.

14. The method of claim 11, further comprising computing a tape reversal location based at least in part on a number of tape reversals previously performed within a tape reversal region.

15. The method of claim 11, further comprising reducing tension applied to the tape during direction reversal.

16. The method of claim 11, further comprising selecting a tape reversal location farthest from the tape data region to stop and reverse the tape for the first direction reversal at an end of the tape.

17. A system, comprising:
    means for selecting variant tape direction reversal locations at an end of a magnetic tape; and
    means for reversing the travel direction of the magnetic tape at a selected tape direction reversal location.

18. The system of claim 17, wherein the means for selecting reversal locations selects at random a tape reversal location from a plurality of possible tape reversal locations at the end of each wrap.

19. The system of claim 17, wherein the means for selecting reversal locations selects a tape reversal location a pre-determined distance from the last selected tape reversal location.

20. The system of claim 17, wherein the means for selecting reversal locations selects a tape reversal location not requiring the tape heads to pass over a previously selected tape reversal location.

21. A system, comprising:
    a wrap reverse location controller that determines a magnetic tape reversal location at which the tape drive will reverse the direction of a magnetic tape; and
    a motor controller that reduces tension applied to the magnetic tape as the system reverses the direction of the magnetic tape.

22. The system of claim 21, wherein the wrap reverse location controller determines the tape reversal location by varying, relative to the tape heads, the longitudinal tape location at which tape direction reversals are performed at a first end of the magnetic tape.

* * * * *

UNITED STATES PATENT AND TRADEMARK OFFICE
CERTIFICATE OF CORRECTION

| | | |
|---|---|---|
| PATENT NO. | : 7,835,103 B2 | Page 1 of 1 |
| APPLICATION NO. | : 12/242180 | |
| DATED | : November 16, 2010 | |
| INVENTOR(S) | : C. Anderson et al. | |

It is certified that error appears in the above-identified patent and that said Letters Patent is hereby corrected as shown below:

In column 7, line 38, in Claim 1, after "and" insert -- based on --.

Signed and Sealed this
Thirty-first Day of May, 2011

David J. Kappos
*Director of the United States Patent and Trademark Office*